Jan. 21, 1930.  A. C. TAYLOR  1,744,062
ELECTRICAL WELDING MACHINE
Filed May 20, 1926   7 Sheets-Sheet 1

Inventor
A. C. Taylor

By Fisher, Moser Tudor
Attorney

Jan. 21, 1930.  A. C. TAYLOR  1,744,062
ELECTRICAL WELDING MACHINE
Filed May 20, 1926   7 Sheets-Sheet 2
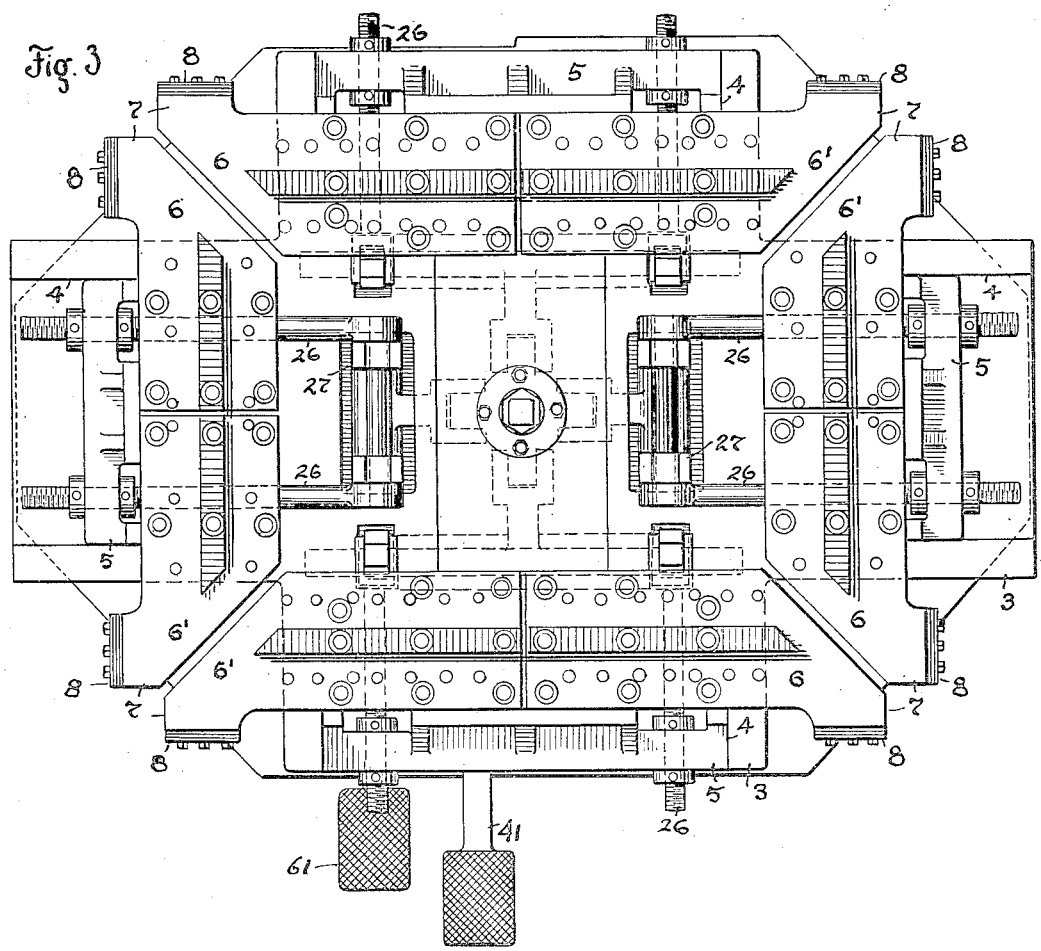
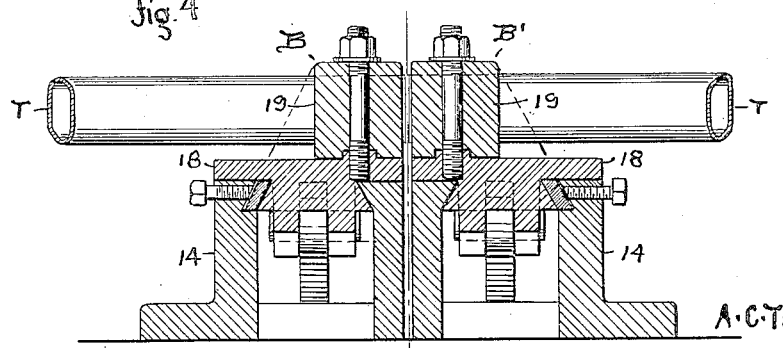
Inventor
A. C. Taylor Jan. 21, 1930.  A. C. TAYLOR  1,744,062
ELECTRICAL WELDING MACHINE
Filed May 20, 1926  7 Sheets-Sheet 3
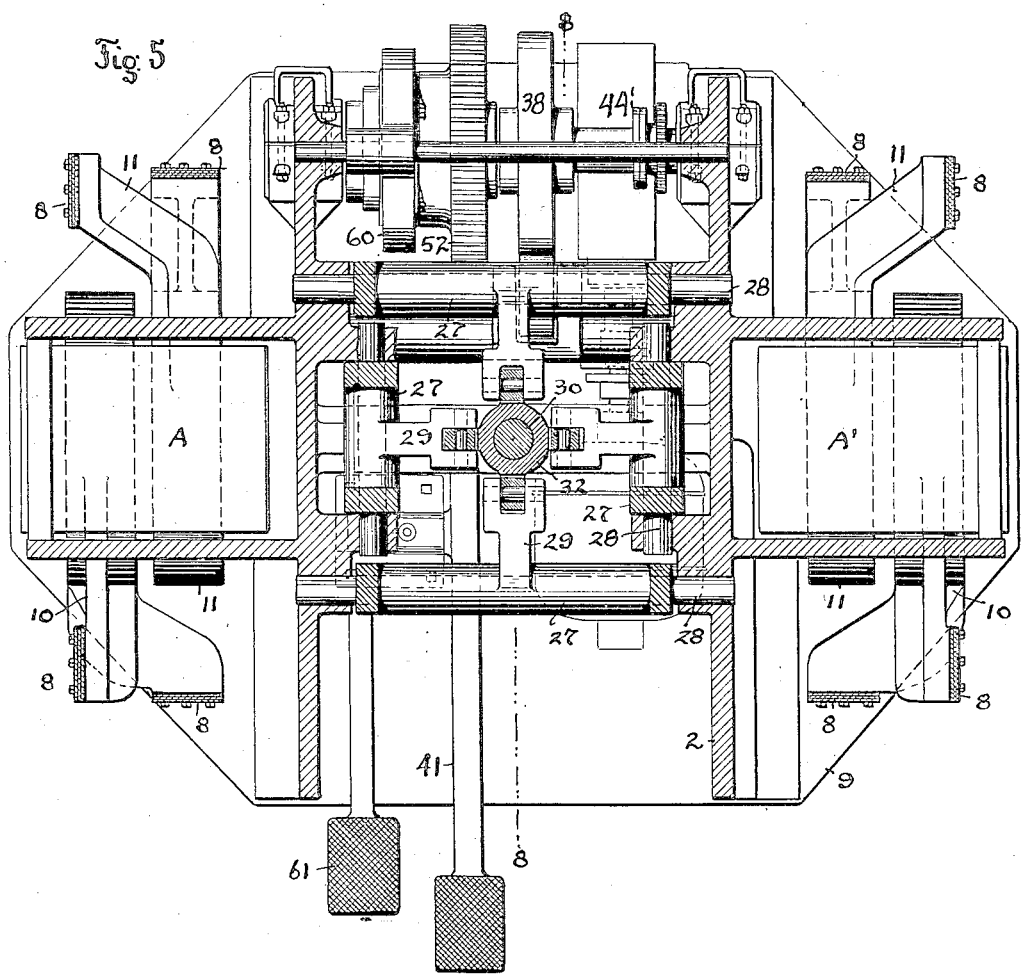
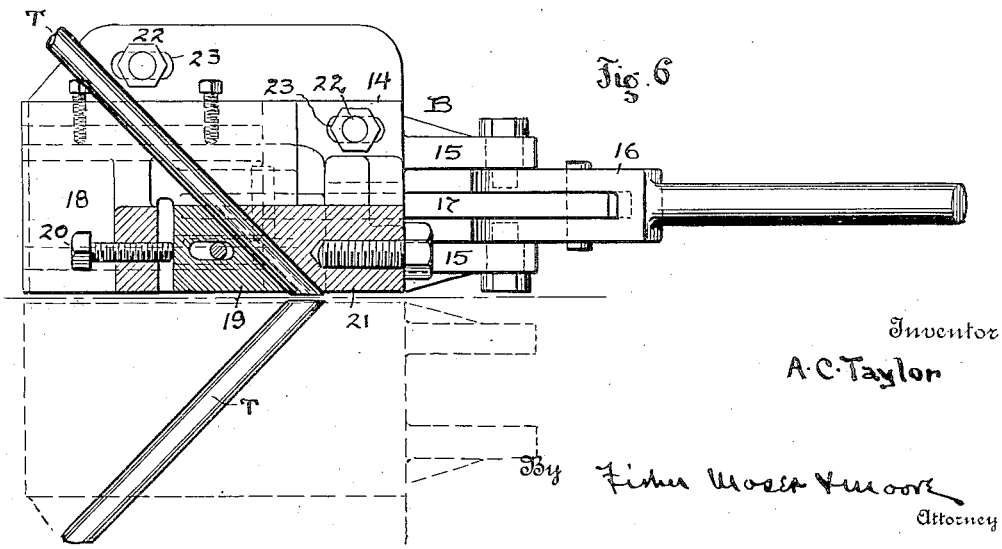
Inventor
A. C. Taylor

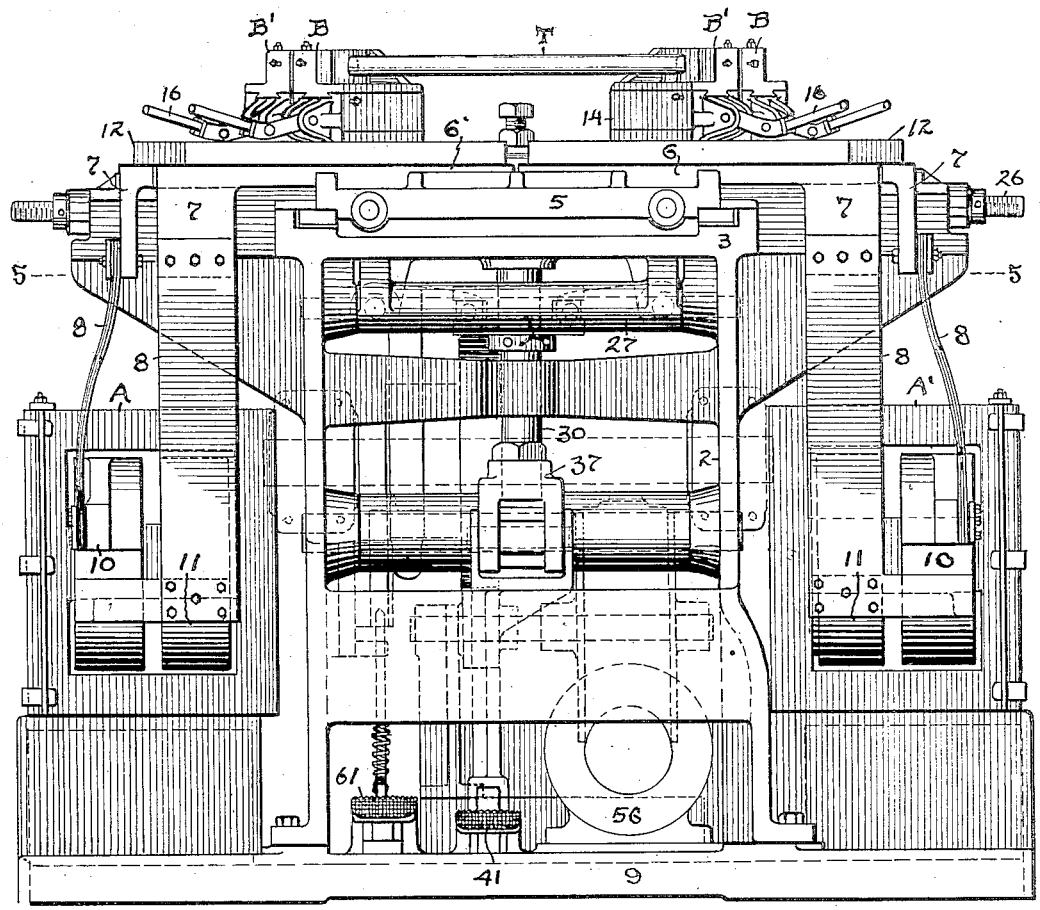

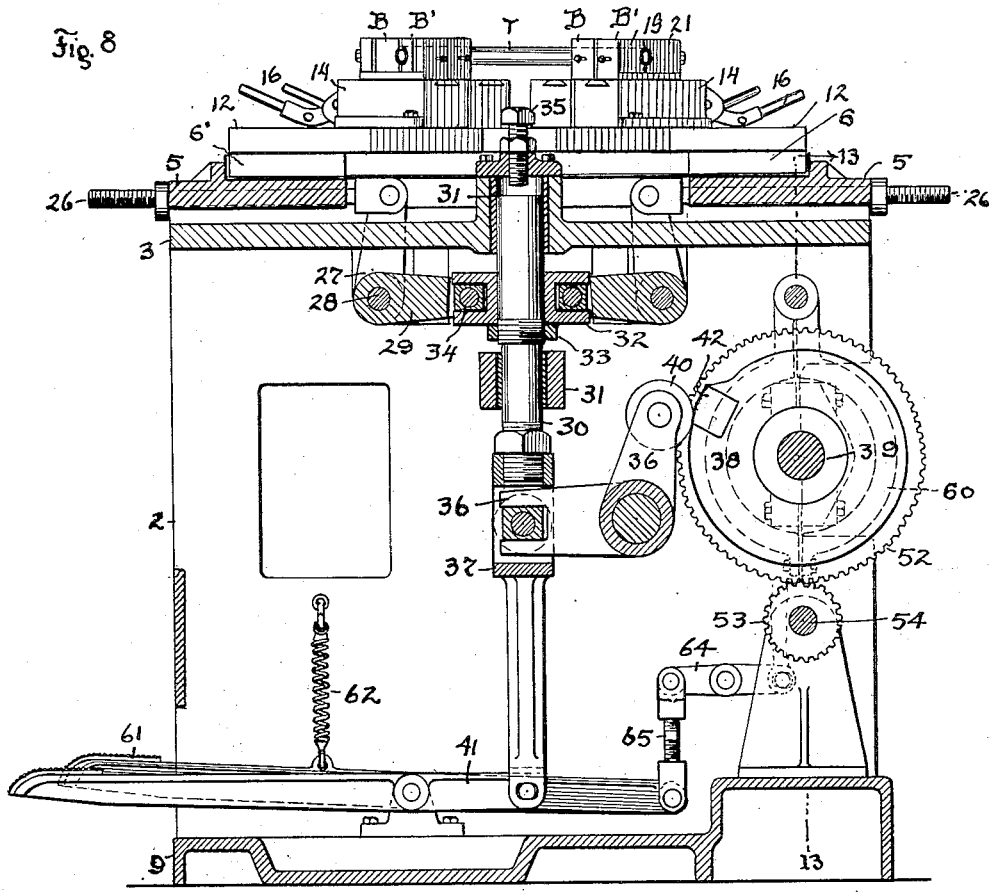
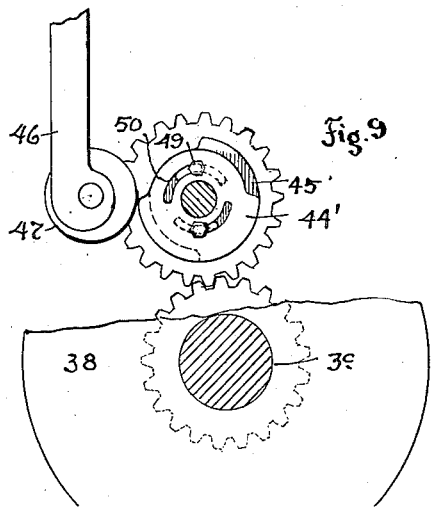
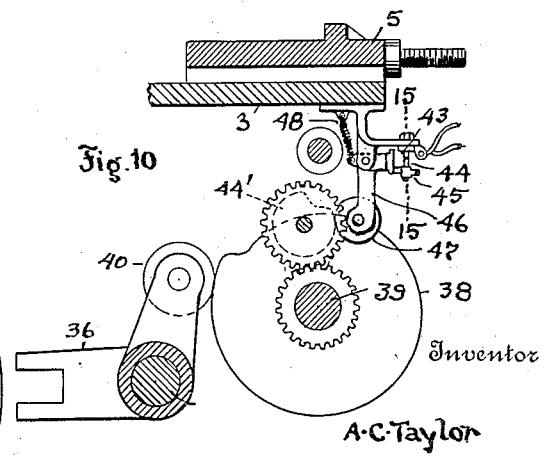

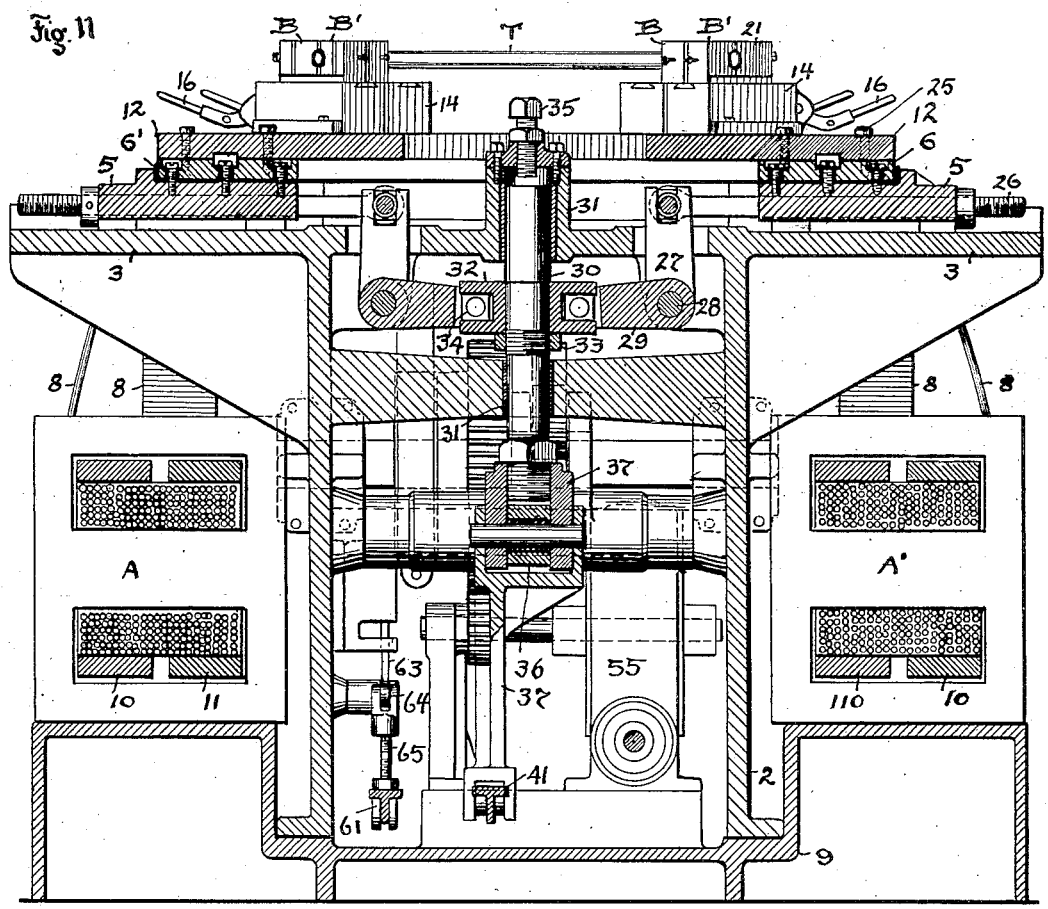
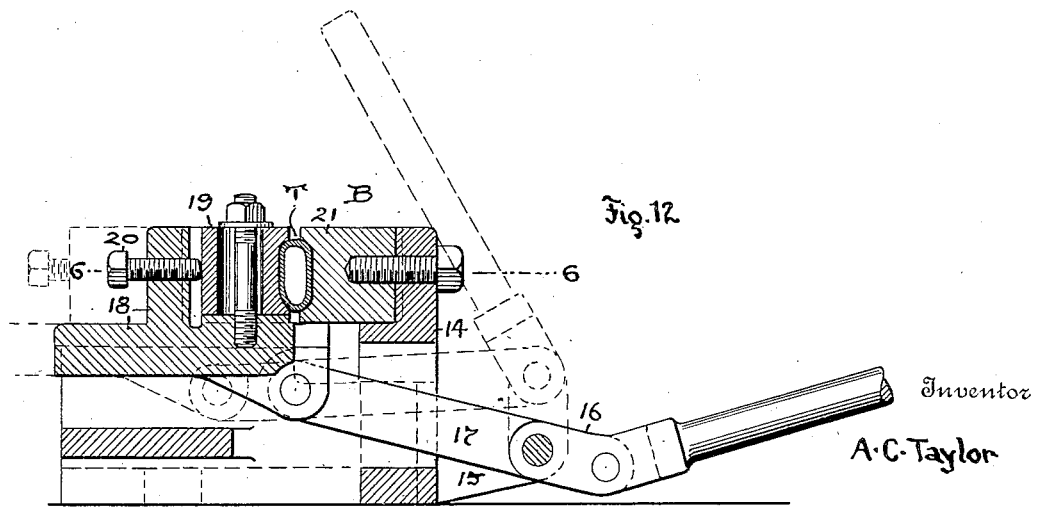

Jan. 21, 1930. A. C. TAYLOR 1,744,062
ELECTRICAL WELDING MACHINE
Filed May 20, 1926 7 Sheets-Sheet 7
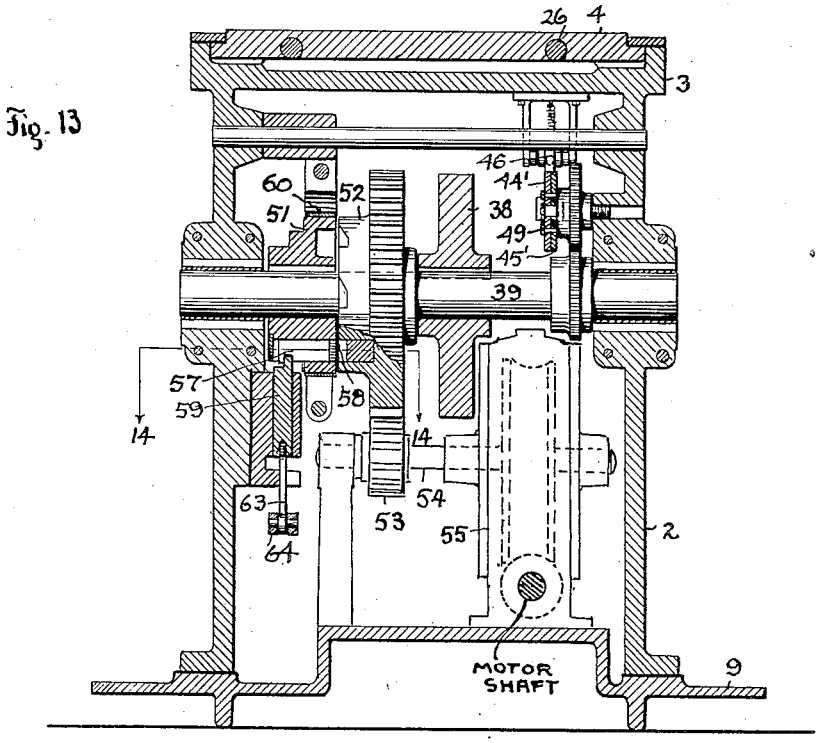
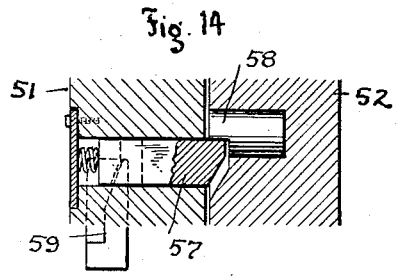
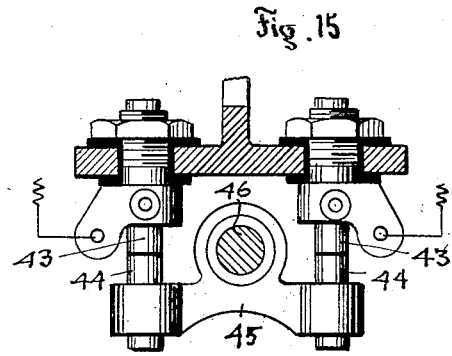
Inventor
A.C. Taylor
By Fisher, Moser & Wood
Attorney Patented Jan. 21, 1930

1,744,062

UNITED STATES PATENT OFFICE

ALBERTIS C. TAYLOR, OF WARREN, OHIO

ELECTRICAL WELDING MACHINE

Application filed May 20, 1926. Serial No. 110,393.

My invention relates to electrical welding, and in general my object is to provide a machine for welding the mitered joints of a rectangular frame electrically together, especially a tubular metal frame such as an automobile wind-shield frame. As constructed the machine is adapted to permit four tubular metal pieces to be assembled in the form of a rectangle with the mitered ends of each piece spaced a slight distance apart from the mitered ends of the pieces to which they are to be joined. Upon starting the machine the mitered ends at all four corners of the frame are welded together simultaneously, the operation being entirely automatic, including the switching of the electric welding current. Release of the welded frame is effected manually, and resetting is in part manual.

Figure 1:
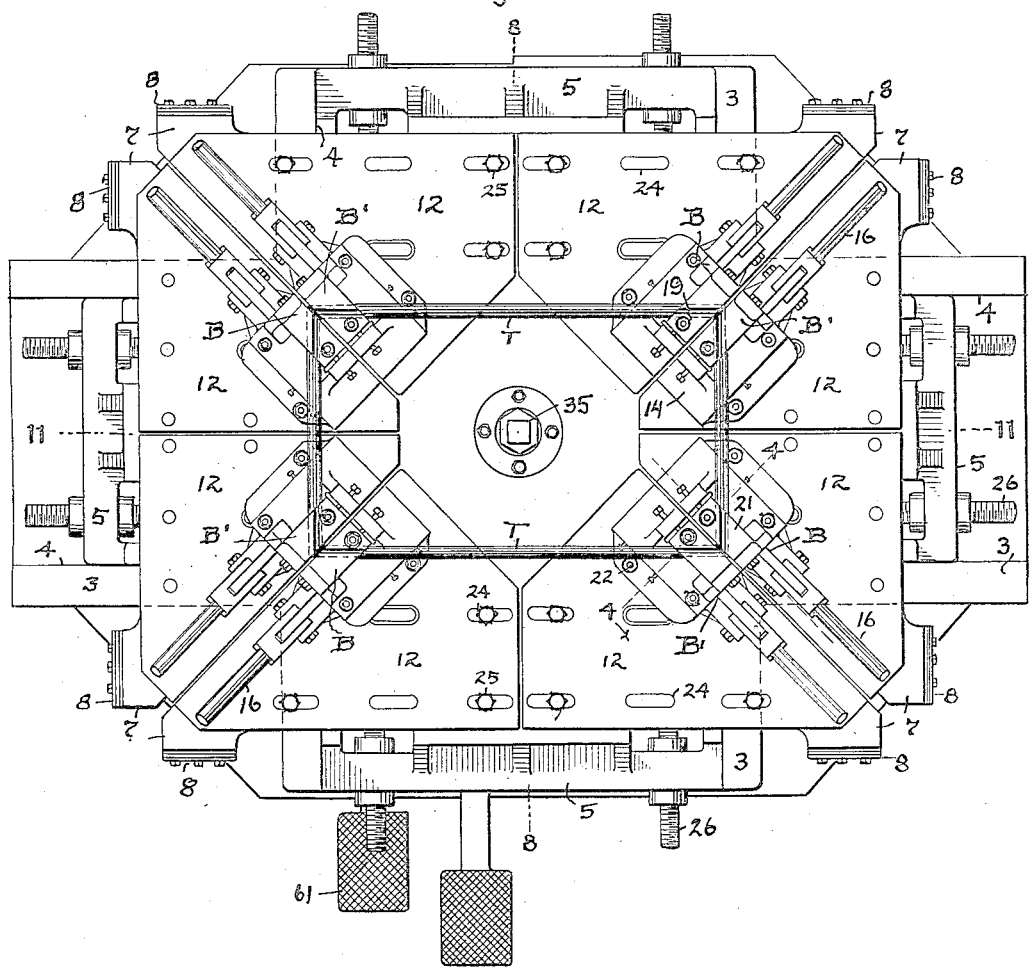
Figure 2:
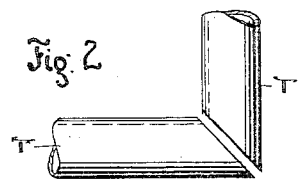

In the accompanying drawings, I disclose a machine constructed according to my invention, Fig. 1 showing a top view thereof with a completed frame thereon. Fig. 2 is an elevation of two mitered pieces of tubing as related at the beginning of welding operations. Fig. 3 is a top view of the machine, the clamping holders and their supporting plates being removed to disclose their sliding supports or tables. Fig. 4 is an enlarged sectional view on line 4—4 of Fig. 1 of a pair of clamping holders for one corner of the tubular frame. Fig. 5 is a horizontal section, on line 5—5 of Figs. 7 and 11, of the machine. Fig. 6 is a top view and horizontal section of one of the clamping holders, on line 6—6 of Fig. 12. Fig. 7 is a front elevation of the machine. Fig. 8 is a vertical section of the machine, on line 8—8 of Figs. 1 and 5. Fig. 9 is an enlarged view of the adjustable timing and operating cam for the electric switch, and Fig. 10 is a smaller view of the electric switch and the cam and associated operating parts. Fig. 11 is a vertical section of the machine on line 11—11 of Fig. 1. Fig. 12 is a sectional view of one of the clamping holders on line 12—12 of Fig. 6. Fig. 13 is a vertical section of the machine on line 13—13 of Fig. 8. Fig. 14 is an enlarged sectional view of the clutch on line 14—14 of Fig. 13. Fig. 15 is an enlarged detail view of the electric switch, on line 15—15 of Fig. 10.

My improved welding machine comprises a rectangular main frame 2 having a cross-shaped table top 3 in which four pairs of guideways 4 are provided at right angles to each other to support four separate slides 5 in the same horizontal plane. These four slides may be shifted concurrently toward or away from the center of the machine, and each slide carries two ribbed plates 6 and 6', respectively, which are electrically insulated from each other and their common carrier, the slide. The ribbed plates 6 and 6' are electric-current conductors, each having a mitered end and a depending terminal 7 to which a flexible laminated band 8 is attached. Two welding transformers A—A' are mounted upon base 9 of the machine, one beneath each overhanging end of table top 3, and each transformer embodies two secondaries 10 and 11. The terminals of one secondary in each transformer extend forwardly toward the front of the machine, and the terminals of the other secondary in each transformer extend rearwardly, thus permitting the separated terminals of each secondary to be connected to a pair of bands 8—8 extending downwardly from the overhanging mitered ends of the conducting plates 6—6' at each corner of the table top. Thus one corner plate is connected to the positive terminals of the secondary and the companion corner plate is connected to the negative terminal of the same secondary, and because the angularly related corner plates move apart or together at right angles, their conductor bands are placed preferably at right angles to permit each band to flex freely in the direction of movement of its connected plate. Each conductor plate carries another larger plate 12 of triangular shape upon its upper face, see Fig. 1, all such plates being spaced apart at their edges, and the dividing line between the juxtaposed plates at the four corners of the machine being at an angle of forty-five degrees to correspond with the mitered ends of the conductor plates 6—6' beneath the same. Separate work clamping devices or holders B—B' are mounted upon the corner plates 12 at each side of the dividing line, and the welding current passes through these companion holders when the mitered ends of the tubing T are clamped in the holders and brought together by shifting the slides and the parts carried thereby toward the center of the machine.

There are four sets or pairs of clamping holders, and as these holders are constructed alike a description of one will suffice for all. Thus, referring to Figs. 4, 6, and 12, each clamping holder comprises a flanged body 14 having projecting arms 15 between which a bifurcated lever 16 is pivoted. A link 17 connects this lever with a slidable block 18 having a channeled jaw 19 bolted adjustably thereto and held by a set screw 20. The channeled face of jaw 19 is set at an angle of forty-five degrees opposite a corresponding channeled face in a fixed jaw 21 bolted to body 14, and when lever 16 is lowered a flattened piece of tubing T may be clamped between the jaws with the mitered end of the tube projecting slightly beyond the flat sides of the two jaws, substantially as shown in Fig. 6. The companion clamping device holds a second mitered piece of tubing in the same way so that when the slides and plates which carry these clamping devices are shifted the mitered tubes will be brought together with upsetting pressure as the electric welding current heats the ends to a welding temperature. The body part 14 of each clamping device is secured to a plate 12 by bolts 22 which pass through slots 23 to permit each device to be adjustably shifted upon the plate longitudinally in respect to the adjacent clamping device so that the mitered ends of the tubes may be aligned accurately. Several of the plates 12 and the clamping devices thereon may also be adjusted on parallel lines with the tubing, such plates 12 having slots 24 for the bolts 25 which clamp them to the supporting plates 6 or 6', see Fig. 1. In that way all the holders may be properly set to clamp four pieces of mitered tubing in squared relation, and to permit four mitered joints to be simultaneously welded together.

The mechanism for operating the slides which carry the plates and clamping holders for the work, comprises a pair of coupling rods 26 adjustably connected to each slide 5, and separate bell cranks 27 connected to the inner ends of each pair of rods. The bell cranks rock on four shafts 28 which are arranged horizontally at right angles within frame 2 beneath top 3, and the bell cranks include horizontal arms 29 extending toward a vertical plunger 30 held in bearings 31 at the center of the machine. A grooved collar 32 is sleeved upon plunger 30 and rests upon an adjustable nut 33 fixed to the plunger, and each horizontal arm 29 has a bearing block 34 slidably engaged with grooved collar 32 whereby when the plunger is reciprocated all four bell cranks will be oscillated concurrently and in the same degree, thus shifting the slides and work-holders correspondingly. A set screw 35 at the center of the top of the machine serves as a limiting stop for the upward movement of the plunger, and a forked crank 36 operating in a yoke 37 attached to the lower end of plunger 30 serves to lower the plunger through the agency of a rotatable cam 38 on a clutch shaft 39, said cam being adapted to engage a roller 40 upon the vertical arm of crank 36. Yoke 37 is connected to one end of a treadle 41 which is pivotally supported upon the base or pedestal of the machine, and when the plunger is lowered upon rotation of the cam the foot engaging pedal of treadle 41 is raised.

In Fig. 8, cam 38 is shown nearly at the end of its cycle of rotation, with roller 40 about to ride over a hardened inset piece 42 which projects slightly beyond the circular face of the cam to quicken the plunger movement and produce a sudden upset in the weld, it being understood that the cam in its rotary travel to this point has caused the slides on the table top to move the mitered pieces into contact while a welding heat is being established by the passage of an electric welding current through each mitered joint. The flow of electric current is started automatically at the beginning of the downward movement of the plunger or shortly thereafter, an electric switch being suspended for that purpose from the bottom of table top 3. This switch is adapted to be thrown on by a pair of relatively-adjustable cam disks 44'—45' geared to clutch shaft 39, see Fig. 10, and the switch comprises a pair of stationary contacts 43—43 which are adapted to be engaged by a second pair of contacts 44—44 affixed to an equalizing bar 45, see Fig. 15. Bar 45 is rockably connected to one arm of a crank member 46 having a depending part carrying a roller 47 which is held by a spring 48 in riding engagement with the cam disks 44'—45', see Figs. 9 and 10. These disks have similar concentric high and low riding surfaces, and by rotating one disk in respect to the other the length of the low riding surface may be increased or decreased, and when adjustment has been made the two disks may be clamped tightly together by bolts or screws 49 which pass through slots 50 in one or both disks. Thus when roller 47 occupies the gap or low point of the cam the switch is open and this is the starting position of the parts, but the closing and opening movements of the switch may be timed by adjusting the two cam disks rotatably in respect to each other.

The clutch shaft revolves only once in the welding operation and is so-called because it carries a brake clutch member 51 and a rotatable ratchet clutch 52 which is geared to a drive pinion 53 on a counter shaft 54. This counter shaft has bearing in part in a worm gear casing 55, and which casing is stationed upon the base or pedestal at the rear of the machine together with an electric motor 56 for operating said driving elements. A spring pressed shot bolt 57 carried by clutch member 51 is adapted to interlock with any one of a number of teeth 58 on ratchet clutch 52 whenever a beveled detent 59 is withdrawn from the notched end of bolt 57, see Figs. 13 and 14, thereby causing the constantly revolving ratchet clutch 52 to rotate clutch member 51 and shaft 39 to which it is keyed. At the end of a single revolution, clutch member 51 carries the notched part of shot bolt 57 into contact with beveled detent 59 and the bolt is shifted longitudinally to disconnect it from the ratchet tooth 58 with which it happens to be engaged, in this way stopping further rotation of clutch shaft 39 and all the parts operated thereby. A stationary brake band 60 encircles clutch member 51 to stop the rotation of clutch shaft 39 always at the same point so that starting may always proceed with all of the working parts related as they should be at the beginning of operations.

Starting is controlled by a treadle 61 which is pivotally supported upon the base of the machine at one side of the plunger operating treadle 41. A spring 62 holds the pedal end of treadle 61 in a raised position and therethrough also presses the detent 59 upwardly in locking contact with shot bolt 57, said detent being connected by a link 63 to one end of a counter-acting lever 64 and the other end of said lever being connected by an adjustable link 65 to the inner end of treadle 61, see Figs. 8 and 13.

Briefly recapitulating, the machine operates as follows: Assuming all of the clamping dies or holders B—B′ are open, four mitered pieces of tubing of the proper size and length are introduced between the jaws with the mitered ends separated but in opposing relation, the four pieces being squared in respect to each other as delineated in Fig. 1. The clamping levers 16 are then lowered to clamp the opposite ends of said pieces rigidly between the jaws or dies. Starting treadle 61 is then depressed by the foot of the operator whereupon detent 59 releases shot bolt 57 which in turn interlocks the clutch members 51 and 52 together thereby causing rotation of shaft 39 and its cam 38 and also electric switch cams 44—45. Rotation of cam 38 oscillates crank 36 which lowers plunger 30 gradually until the insert piece 42 in cam 38 is reached whereby a quicker and more powerful thrust is imparted to the plunger and its connected parts, in this way shifting the four slides and their supporting plates and the work clamping devices carried thereby. All four slides and the parts thereon are moved at right angles toward the center of the table top, the movement of course being limited but sufficient to bring all of the mitered ends of the respective pieces of tubing into contact eventually. The electric switch which supplies the transformers with electric current is automatically turned on in the meantime and an electric current of low voltage and high amperage passes through each mitered joint and heats the meeting edges to a welding condition. This movement of the mitered ends towards each other may be regulated and timed to produce a flash weld which weld may be upset at the end of the rotative movement of cam 38, then the electric current is automatically cut off and detent 59 withdraws shot bolt 57, providing the operator withdraws his foot or relieves the foot pressure on treadle 61 in the meantime. As a result the plunger and all four slides come to a dead stop with the low point of cam 38 opposite roller 40 on crank 36 so that the plunger may be raised manually by means of treadle 41. Uplift of the plunger is brought about after the clamping devices are opened and the welded frame is released from the grip of the movable clamping jaws, and such uplift of the plunger shifts the slides outwardly, thus releasing the welded frame from the stationary clamping jaws. The completed frame may now be readily removed and the same welding operation repeated upon other mitered pieces.

What I claim, is:

1. An electrical welding machine, comprising movably related means for holding a plurality of metal pieces in the form of an open frame, the ends of said pieces being mitered, and means for simultaneously shifting all said holding means in combination with automatic mechanism for electrically welding the mitered ends at each corner of the frame simultaneously together.

2. An electrical welding machine, comprising separate sets of angularly related holders adapted to secure separate mitered pieces of metal in angular relation; means for shifting said holders and the pieces thereon simultaneously toward each other with engaging and upsetting pressure on the mitered ends of said pieces; and means for passing separate welding currents through the separate mitered ends prior to the application of an upsetting pressure thereto.

3. An electrical welding machine, comprising means adapted to permit four metal pieces to be assembled and held in the form of a rectangle with the corresponding ends of said pieces in separated juxtaposed position, means adapted to bring said four pieces simultaneously into pressure engaging relation at their ends, and means adapted to pass an electric welding current simultaneously through all of the engaging ends of said pieces.

4. An electrical welding machine, comprising a series of angularly related work holders adapted to permit four metal pieces to be assembled and held in the form of a rectangle, the ends of said pieces being mitered and opposed for union with each other; means for moving said holders and the four metal pieces automatically toward each other; and means for passing an electric welding current through the mitered ends of said pieces during the movement of said holders and metal pieces.

5. An electrical welding machine, comprising pairs of diagonally arranged work holders adapted to permit separate mitered pieces to be clamped in abutting relation; means adapted to shift the companion holders in each pair toward each other to bring the mitered ends of said pieces into welding relation; and means adapted to pass an electric welding current concurrently through each pair of work holders and the mitered ends of said pieces when held therein.

6. An electrical welding machine, comprising separate slides movable at right angles to each other; pairs of electric-current conducting work holders diagonally arranged on said slides, the companion holders being on separate slides and adapted to clamp the mitered ends of separate pieces of metal in welding relation therein; and means adapted to move said slides at right angles to permit the application of pressure and an electric welding current to said mitered ends.

7. An electrical welding machine, comprising a table having slides thereon, means adapted to actuate said slides concurrently, electric-current conducting plates mounted adjustably in respect to each other upon said slides, and separate pairs of work holders mounted upon each plate diagonally of said table.

8. An electrical welding machine, comprising a table, a set of slides movable at right angles upon said table, separate plates mounted in insulated position upon each slide having separate transformer connections, and work holders supported upon each plate, said work holders being arranged in pairs diagonally at the ends of said slides.

9. An electrical welding machine, comprising a table, slides at each side and end of the table, conductor plates upon said slides having terminals depending therefrom at each corner of the table, an electric transformer at each of said tables connected to said terminals, and separate pairs of work holders mounted upon said plates diagonally at the corners of said table.

10. An electrical welding machine, comprising a table and slides thereon, conductor plates upon said slides having terminals at their ends closely related in pairs at each corner of the table, work holders at each corner of the table carried by said plates, an electric transformer at each end of said table, and flexible bands connecting the secondaries of said transformers with said terminals.

11. An electrical welding machine, comprising a table having slides movable at right angles thereon, each slide having a pair of conductor plates thereon, electric transformers beneath said table, each transformer having a pair of secondaries, the terminals of each secondary being connected flexibly with a pair of said plates, and a work holder mounted upon each plate, said work holders being arranged in pairs at each corner of the table.

12. An electrical welding machine, comprising a table having four slides movably at right angles thereon, means connected with said slides adapted to reciprocate them in unison, separate current conducting plates upon each slide extending to a corner of the table, an electric welding transformer at each end of the table having separate pairs of secondaries, the terminals of one pair of secondaries extending beneath one corner of the table and the terminals of the other pair of secondaries extending beneath another corner of the table, flexible bands connecting the terminals of each secondary to the corner extensions of a pair of said current-conducting plates, and paired work-holders mounted upon said plates.

13. An electrical welding machine, comprising a table having four slides movable at right angles thereon, electric current conducting plates and work holders carried on each slide; and means adapted to shift said slides and the parts carried thereby in unison, comprising a vertical plunger, rock arms connected with said plunger and said plates, and a rotatable cam and crank arm adapted to operate said plunger.

14. An electrical welding machine, comprising a plural number of slides carrying conductor plates and clamping holders for the pieces to be welded, a vertically movable plunger operatively connected to said slides to shift them in unison, cam mechanism adapted to operate said plunger and slides to feed the work and apply pressure in welding operations, and manually operable means adapted to restore the plunger and slides and the parts carried by the slides to their starting position.

15. An electrical welding machine, comprising a plurality of slides having electric current conducting plates thereon, clamping holders for the work mounted upon said slides, a vertical plunger having operating connection with said slides adapted to move them in unison, cam mechanism adapted to operate said plunger, clutch mechanism adapted to control the operation of said cam mechanism, and a treadle device adapted to actuate said plunger when the cam is inactive.

16. An electrical welding machine, comprising a plurality of slides carrying electric-current conductors and work-holders, cam operated mechanism adapted to shift said slides in unison in one direction, an electric switch for controlling the duration of application of a welding current to the work held in said work holders, and clutch operated mechanism adapted to control the operation of both said cam operated mechanism and electric switch.

17. An electrical welding machine, comprising a table having four slides movable thereon at right angles, said slides having four sets of diagonally related work holders mounted thereon, power means adapted to shift said slides and work holders toward each other, manual operable devices adapted to shift said slides and work holders in the opposite direction, and an automatic electric switch operatively connected with said power means adapted to control the flow of electric welding current through said work holders.

18. An electrical welding machine, comprising a table having four slides movable thereon, carrying four sets of welding devices, a vertical plunger centrally of said table, an adjustable rocker arm connection for said slide, a crank member adapted to shift said plunger in one direction, a treadle device adapted to shift said plunger in the opposite direction, a rotatable cam adapted to operate said crank member, and power transmitting means including a clutch and treadle for controlling the rotation of said cam.

19. An electrical welding machine, comprising a table having four slides movable at right angles thereon, a pair of electric current conducting plates upon each slide having extensions at each corner of the table, electric transformers at opposite ends of said table electrically connected to said extensions, superposed members adjustably secured to certain conducting plates, clamping holders diagonally at each corner of the table, upon said members and plates, and each clamping holder comprising a fixed jaw and an adjustable movable jaw adapted to clamp a mitered piece of metal opposite a similar mitered piece held at right angles thereto.

20. An electric welding machine, comprising means for assembling and holding a plural number of metal pieces in the form of an open frame, and means for moving said assembling and holding means simultaneously toward each other, in combination with means for electrically welding all the corners of said frame simultaneously together.

In testimony whereof I affix my signature.

ALBERTIS C. TAYLOR.